(12) United States Patent
Lukis et al.

(10) Patent No.: US 7,957,830 B2
(45) Date of Patent: Jun. 7, 2011

(54) CNC INSTRUCTIONS FOR SOLIDIFICATION FIXTURING OF PARTS

(75) Inventors: Lawrence J. Lukis, Wayzata, MN (US); Yuri A. Dreizin, Golden Valley, MN (US); Gregory M. Bloom, Lake Elmo, MN (US)

(73) Assignee: Proto Labs, Inc., Maple Plains, MN (US)

( * ) Notice: Subject to any disclaimer, the term of this patent is extended or adjusted under 35 U.S.C. 154(b) by 373 days.

(21) Appl. No.: 12/136,552

(22) Filed: Jun. 10, 2008

(65) Prior Publication Data
US 2009/0302496 A1 Dec. 10, 2009

(51) Int. Cl.
*G06F 19/00* (2011.01)
*G06F 17/50* (2006.01)

(52) U.S. Cl. ........ 700/160; 264/221; 264/112; 264/472; 264/673; 29/557; 29/841; 29/848; 700/97; 700/197; 700/201; 700/200; 269/47; 269/95; 269/100; 269/293; 425/58; 425/589; 705/400; 249/35; 249/94; 249/195

(58) Field of Classification Search .................... 700/97, 700/160, 197, 201; 264/112, 272.2, 412, 264/673, 2.5, 2.3, 2.35, 478; 705/400; 29/841, 29/848; 47/1.01 P; 249/35, 94, 195; 425/58, 425/589; 269/47, 95, 100, 293
See application file for complete search history.

(56) References Cited

U.S. PATENT DOCUMENTS 6,675,055 B1 * 1/2004 Fischer .......................... 700/97
6,688,871 B1 * 2/2004 Lee et al. .................. 425/129.1
6,704,611 B2 3/2004 Coleman et al.
7,305,367 B1 12/2007 Hollis et al.
(Continued)

OTHER PUBLICATIONS

Sarma et al, "Reference Free Part Encapsulation" A new Universal Fixturing Concept, 1997, Journal of Manufcatruing Systems, vol. 16/No. 1, pp. 35-47.*

(Continued)

*Primary Examiner* — Ramesh B Patel
*Assistant Examiner* — Olvin Lopez
(74) *Attorney, Agent, or Firm* — Shewchuk IP Services, LLC; Jeffrey D. Shewchuk

(57) ABSTRACT

A customer transmits their 3D CAD file for a part to be total profile machined. Computer analysis of the transmitted CAD file produces CNC machining instructions, which are transmitted back to an address defined by the customer. The customer can then use the transmitted CNC machining instructions to total profile machine their own part using their own CNC mill at the location where the part is likely needed. The transmitted instructions include not only the tool paths for CNC machining of the total profile of the part, but also for additional features formed into the encircling portion of a material block from which the part is to be total profile machined. For instance, the CNC machining instructions transmitted back to the customer can define a registration recess and/or channels or undercuts for fluid support material on an A-side of a material block. After the A-side of the block is machined, the customer adds and solidifies fluid support material into the machined recess. The CNC mill is then used to machine a support surface into a portion of the solidified support material surface. A registration fixture is applied into contact with the support surface CNC machining on the B-side of the material block is then performed while the part is supported by the solidified support material, substantially separating the part from the encircling block of material. The support material is then removed, such as by dissolving, freeing the part from the encircling block of material.

12 Claims, 13 Drawing Sheets

U.S. PATENT DOCUMENTS

| | | | |
|---|---|---|---|
| 7,311,466 B2* | 12/2007 | Torvinen | 404/118 |
| 7,620,473 B2* | 11/2009 | Kamiya et al. | 700/160 |
| 2004/0128016 A1 | 7/2004 | Stewart | |
| 2005/0103360 A1* | 5/2005 | Tafoya | 134/18 |
| 2005/0189679 A1* | 9/2005 | Kenison et al. | 264/272.11 |
| 2005/0246052 A1 | 11/2005 | Coleman et al. | |
| 2005/0256604 A1 | 11/2005 | Diehi et al. | |
| 2006/0172261 A1* | 8/2006 | Garry | 433/215 |
| 2007/0038531 A1* | 2/2007 | Lukis et al. | 705/26 |

OTHER PUBLICATIONS

Choi et al, "A new rapid prototyping uing universal auotamed fixturing with feature-based CAD/CAM", 2001, Journal of MAterial Procesing Technology, pp. 285-290.*

Guevara, "Design of a Quick Release Mechanism for use in a Compact Universal Automated Fixturing System", 2000, pp. 1-60.*

Lee et al, "Reference Free Part Encapsulation", 2007, Journal of Manufacturing Systems, pp. 22-36.*

WWW.CELERITIVE.COM, Introducing VoluMill The most advanced milling toolpath available. Downloaded from internet on Jun. 10, 2008.

WWW.CELERITIVE.COM, The VoluMill Advantage. Downloaded from internet on Jun. 10, 2008.

WWW.CELERITIVE.COM, The Client/Server Process:. Downloaded from internet on Jun. 10, 2008.

WWW.CELERITIVE.COM, VoluMill F.A.Q. Downloaded from internet on Jun. 10, 2008.

* cited by examiner

CNC INSTRUCTIONS FOR SOLIDIFICATION FIXTURING OF PARTS

CROSS-REFERENCE TO RELATED APPLICATION(S)

None.

BACKGROUND OF THE INVENTION

The present invention relates to the field of prototype or low volume part making, and particularly to total profile machining of parts such as from blocks of plastic materials using CNC machines, wherein a substantial majority of the surface area of the part is created by the CNC machining.

With the quickening pace of product design schedules, the fast turn-around production of low quantity or prototype parts for testing new designs has become more and more common. Product designers need to move from the drawing board (or, in today's world, the computer screen) to having an example product in hand within weeks if not days. To meet these rapid schedules, many designers have turned to the field of rapid prototyping, to quickly convert their written design drawings into a physical part specimen. Most common rapid prototyping techniques are additive processes, wherein material is added in layers or voxels in the shape desired of the part. Examples of common rapid prototyping techniques include stereo lithography (SLA for stereo lithography apparatus), selective laser sintering (SLS), fused deposition modeling (FDM), laminated object manufacturing (LOM), inkjet-based systems and three-dimensional printing (3DP).

Many rapid prototyping techniques are expensive, and produce a part which, though to some degree dimensionally accurate even for many complex geometries, does not have the physical attributes desired of the final part. Due to the expense on a per part basis, most rapid prototyping techniques are only used for low-volume runs of a part (such as a quantity of 10 or fewer), and not for mid- or high-volume part runs. Lower cost methods of fabricating single part or low-volume runs, which more accurately reflect the physical attributes of the production-run part, are desired.

Machining has long been used to shape metal, wood, plastic and similar solid materials into parts. Machining involves a subtractive process, wherein a solid block of material is held or fixtured in to the tool, and the block is reamed, drilled, sawed, lathed, cut or similarly shaped by removing material from the block to form the shape desired. Computer Numerical Control ("CNC") machining has accelerated the machining process and become commonplace in many part-making and machine shops. CNC machining generally requires writing of code to instruct the CNC machine which tools and tool paths are needed for the material removal steps. The process for generating CNC tool paths can be simple or difficult depending upon the complexity of the tool paths. For simple profiles, typically having a rectangular, box-like or cylindrical shape which can be readily held with vices on the CNC machine, CNC machining may be a viable option, either in low-, mid- or high-volume runs.

As part shape profiles and geometries are designed to be more complicated, CNC machining often requires the creation of custom fixtures for holding the part during machining. It is not unusual for the design and fabrication of the custom fixturing to involve more time and expense than the design and fabrication of a single part itself. With the added time and complexity associated with custom fixturing, CNC machining is rarely used for low-volumes of parts having more complex shapes which need to be fabricated in a quick turn-around time. For parts in mid- or high-volume runs, the design and fabrication of custom fixtures may be warranted, making machining again a viable option depending upon part shape.

Particularly for mid- or high-volume runs, the tooling time required to CNC machine the part can be expensive. CNC mills typically cost hundreds of thousands of dollars, and it is desired to produce as many parts as possible on as few CNC mills as needed. Several companies are involved in a niche market of analyzing part profiles and providing CNC machining instructions which optimize toolpaths to increase the speed of the CNC machining operation. For instance, Celeritive Technologies, Inc. of Cave Creek, Ariz. is marketing a VoluMill software product/system which smooths out toolpaths to increase material removal rates and reduce milling time for parts being milled. For one part, Celeritive advertises a reduction from a 98 second tooling time to a 50 second tooling time. A 48 second improvement in machining time is not significant if performed on a single or a handful of parts, but can be significant if performed on thousands or millions of parts.

In the VoluMill software product/system, a client-side software program is installed on the customer's computer in conjunction with the customer's CAD/CAM package. The client-side software extracts and bundles geometry and parameter information, which is transmitted to a server-side program. The server-side program calculates the CNC toolpaths and transmits such toolpaths back to the customer's computer. The toolpaths, however, are only to cut pockets, steps, slots, channels, and other prismatic shapes into separately and conventionally fixtured materials.

Conventional fixturing methods for CNC often utilize vises, clamps, vacuum surfaces, and so on. These approaches can obstruct tool access to a significant amount of the part or require difficult repositioning of the part for multiple machining operations. Other fixturing methods utilize sacrificial fixtures or tabbed designs which must be cut by the user after removal from the CNC Mill. Relatively few fixturing methods are available which enable "total profile" machining, i.e., machining a substantial majority of the surface area of the part in the CNC machine. Even with custom fixturing, if the machining time for the part takes too long, often other methods of part manufacture will be more cost effective than "total profile" machining.

Injection molding, among other types of molding techniques, is commonly utilized to produce plastic parts from molds. Once the injection mold is created and the injection mold press is properly set up, injection molding can quickly create parts of complex geometries in quick succession to reach high-volume runs. The work of companies such as the Protomold Division of Proto Labs, Inc. of Maple Plain, Minn. ("Protomold") has applied CNC machining and computer analysis techniques to moldmaking, and can make injection molds and injection molded parts in an impressive turn-around time for many plastic parts required in low (for instance, 10 or fewer parts) or mid-range (10 to 10,000 parts) volumes. If warranted by volume needs, more elaborate injection molds (typically of tool steel) can be fabricated for higher volumes of injection molded parts, generally with a greater lead time. Because injection molded parts from Protomold are formed of the identical material and by the same technique (injection molding) which would commonly be used for high-volume production runs, such parts are often superior to rapid prototyped parts.

While injection molded parts from Protomold can be achieved at a much lower cost than previously, the cost of one or two parts still requires creation of the injection mold and its associated cost. In cases where only one or several units of a part are required, further cost reductions would be beneficial. Proto Labs, Inc. started its First Cut Prototype Division to address such needs. First Cut Prototype translates the customer's 3D CAD design into instructions for high speed CNC milling equipment, which then total profile machines the parts directly out of blocks of material. Methods of performing such total profile machining are described in U.S. patent Ser. No. 11/586,223, incorporated by reference. Small quantities (1-10) of functional total profile machined parts are typically shipped within one to three days following receipt of the customer's CAD file.

Even the fast speed, low cost processing provided by First Cut Prototype may not be sufficient for some customers. Extremely fast turn around times may be required for certain parts, which simply cannot await for the shipping time to get the parts from First Cut's machining locations to the customer's address. Even faster methods are needed.

BRIEF SUMMARY OF THE INVENTION

The present invention involves a method and apparatus to enable a customer to total profile machine their own parts. The customer's 3D CAD file for the part to be total profile machined is transmitted to a computer processing location. Computer analysis of the transmitted CAD file produces CNC machining instructions, which are transmitted back to the customer. The customer can then use the transmitted CNC machining instructions to total profile machine their own part using their own CNC mill at the location where the part is likely needed. The transmitted instructions include features amenable to total profile machining, such as the formation of a registration recess and channels or undercuts for fluid support material on an A-side of a material block. The customer adds and solidifies the fluid support material, and the CNC mill can be used to machine a support profile into a portion of the solidified support material surface. CNC machining on the B-side of the material block is then performed while the part is supported by the solidified support material, substantially separating the part from the encircling block of material. The support material is then removed, such as by dissolving, freeing the part from the encircling block of material.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
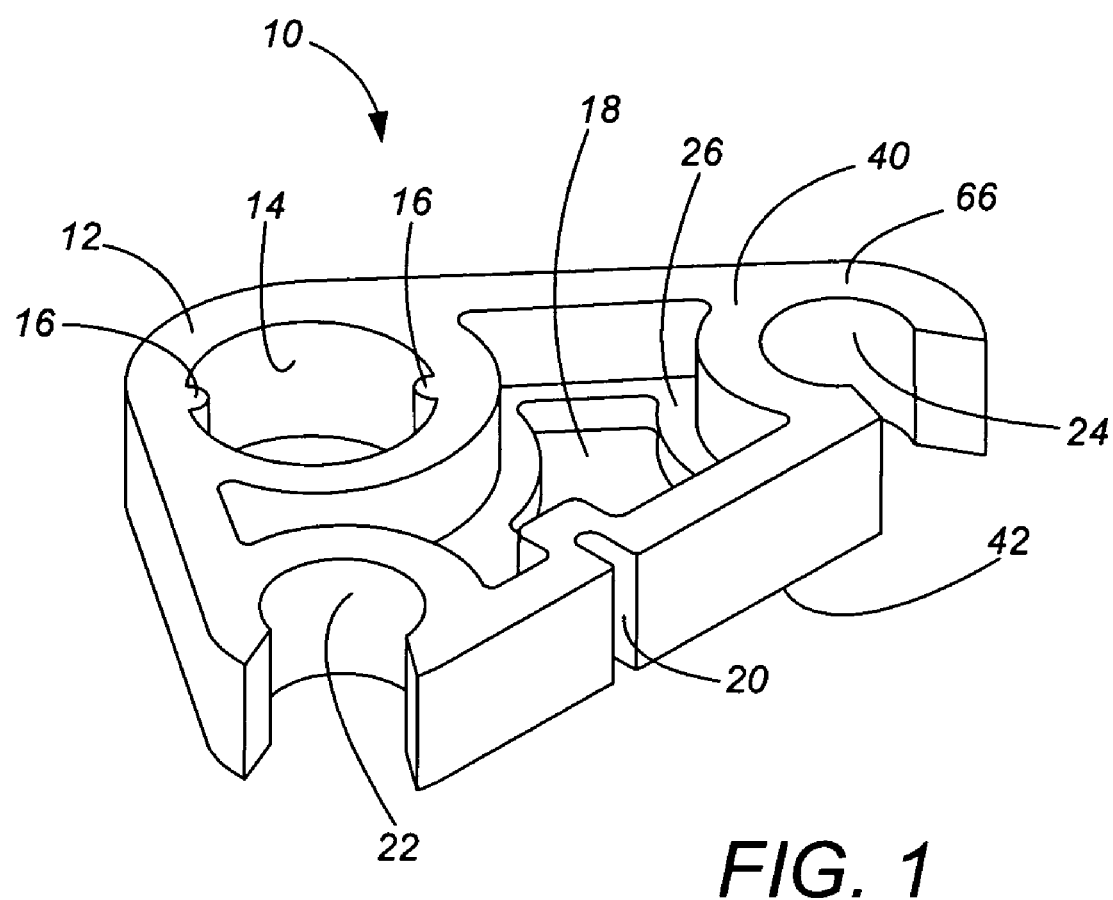
FIG. 1 is a perspective view of an exemplary "cam" part desired by a customer.

The present invention will be described with reference to an exemplary part 10 shown in FIG. 1. FIG. 1 represents a "cam" part 10 designed by the customer. In part because the cam 10 is custom-designed (i.e., not a staple article of commerce) by or for this particular customer, the cam 10 includes numerous features, none of which have commonly accepted names. For purposes of discussion, we will give names to several of these features, including a part outline flange 12, a circular opening 14 with two rotation pins 16, a non-circular opening 18, a notch 20, two corner holes 22 and 24, and a partial web 26. However, workers skilled in the art will appreciate that the customer may in fact have no name or may have a very different name for any of these features.

Figure 2:
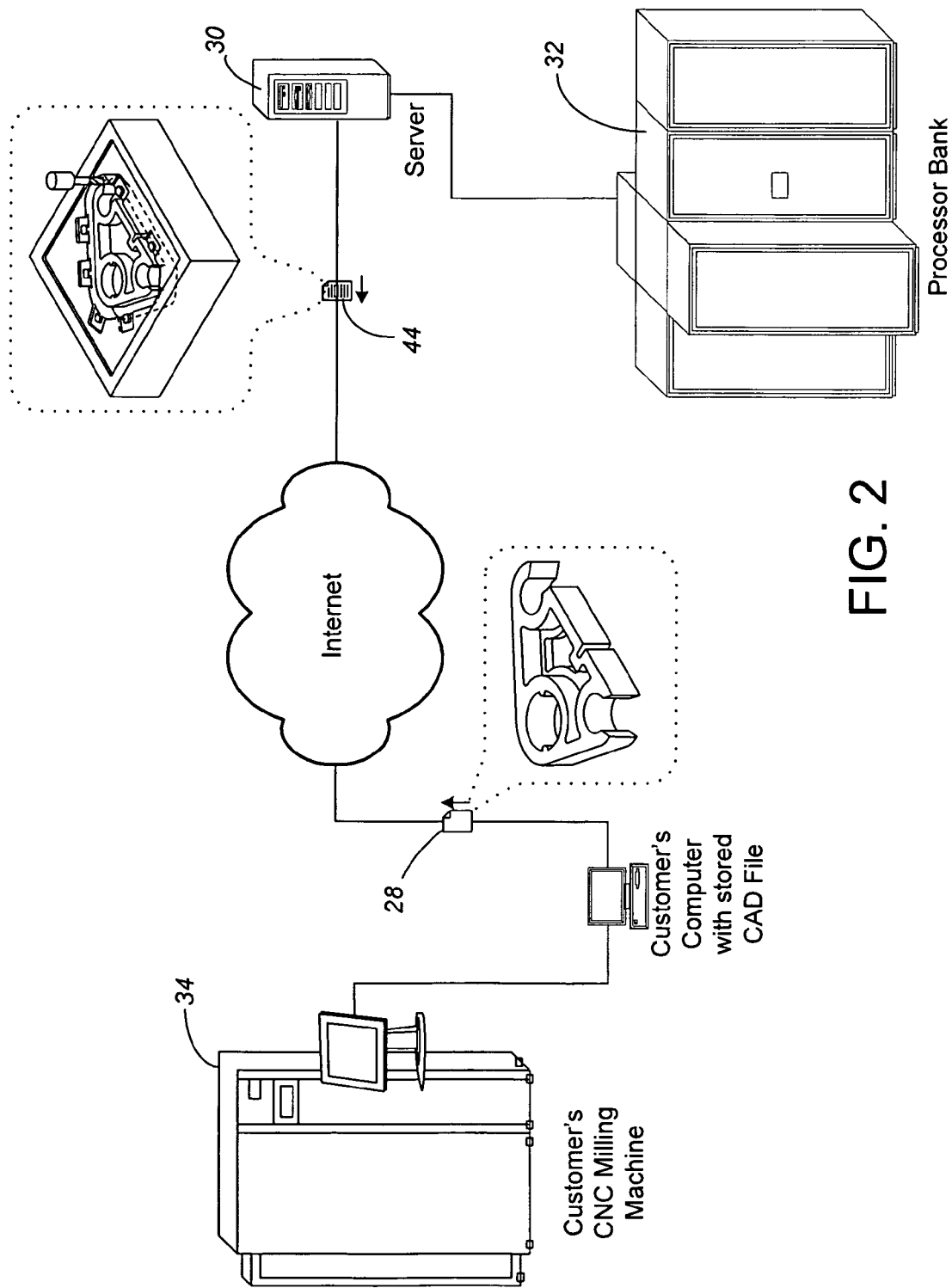
FIG. 2 is a schematic view of data transmissions carrying out the present invention.

In the process of the present invention, the customer (most likely the designer of the cam 10) transmits a CAD part data file 28 such as over the internet to a computer system including a server 30. As partially depicted in FIG. 2, the CAD part data file 28 from the customer is analyzed in a processor bank 32. The server 30 and the processor bank 32 may incorporate software features as disclosed in U.S. patent application Ser. Nos. 11/586,379, 11/369,120, 11/368,590, 11/338,052, 11/114,893 (now issued as U.S. Pat. No. 7,089,082), 11/074,388 (now issued as U.S. Pat. No. 7,123,986), 11/035,648, 10/970,130, 10/325,286 (now issued as U.S. Pat. No. 6,836,699), and 10/056,755 (now issued as U.S. Pat. No. 6,701,200), all owned by the assignee of the present invention (Proto Labs, Inc.) and all incorporated herein by reference. These listed applications are collectively referred to herein as the "Protomold patented system applications", and the teachings of these listed applications are collectively referred to herein as the "Protomold patented system". The features of the Protomold patented system can be used directly or modified to cover the machining of a part as disclosed herein. The present invention further finds application even if toolpaths are created using traditional techniques, or if the "customer" is a part designer working within the same company (or even the same person) as the individual running the CNC machine 34.

Of particular significance, the customer identifies the shape of the part 10 by providing the CAD file 28. The customer also identifies a type of CNC machine 34 upon which the part 10 will be machined, and/or the tools within the CNC tool set available to the customer. For instance, the customer may be given the option of identifying the particular CNC machine 34 owned by the customer, or alternatively select a CNC toolshop location which is local to the customer where the part 10 will be machined. In one embodiment, the server 30 allows the customer to select from a menu of local CNC toolshops which have been established as partners to receive transmitted toolpaths and machine parts to satisfy the customer. In another embodiment, the server 30 questions the customer about CNC mill data upon which the part will be machined, including maximum spindle rpm, maximum range of movement of the spindle in X, Y and Z directions, and so on. The server 30 then allows the customer to select from one or more standard toolsets or expanded toolsets appropriate for the identified CNC mill. As an additional option, the server 30 permits the customer to customize off of the provided list(s) of standard toolsets, providing a list of all the tools stored within the Protomold patented system with a check box next to each listed tool, so the customer can check off which additional tools are available on their CNC mill or uncheck any tools from the standard toolset which are not available on the customer's CNC mill.

As yet a further option, the server 30 may permit the customer to provide detailed geometric data regarding available cutters and/or tool holders, particularly for tools or tool holders which are not widely commercially available or in the stored toolset of the Protomold patented system. For instance, the customer may have one or more customized tools available on their CNC mill, and may provide the server 30 with a CAD file detailing the geometry of those customized tools, possibly further including performance information such as the recommended rpm for the customized tool. Once the customer has provided detailed geometric/performance information about the customer's customized tool, the server 30 may then add that custom tool to the standard list available for that customer for all subsequent parts. To maintain trade secrecy, any custom tools are not provided as options for other customers.

Figure 3:
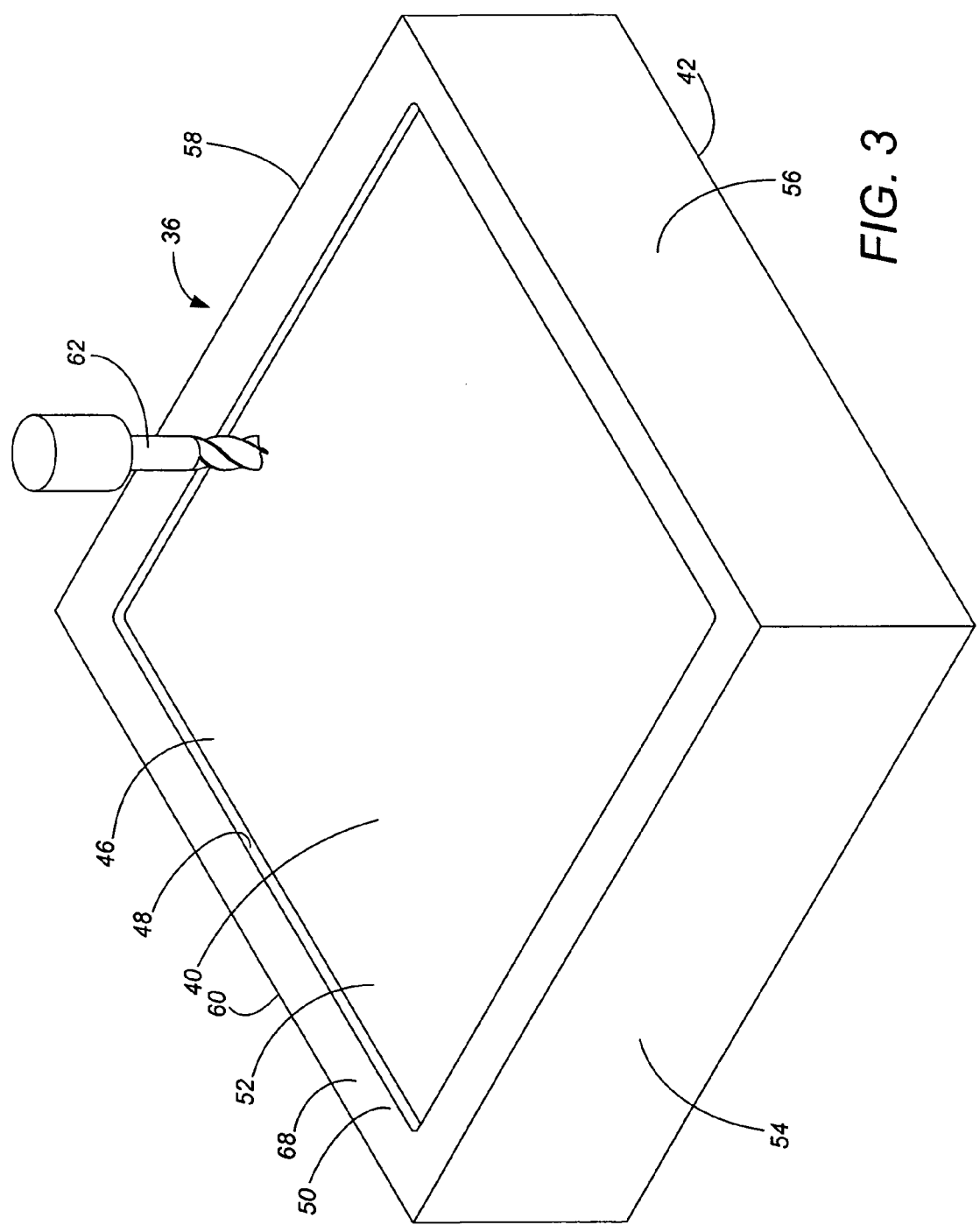
FIG. 3 is a perspective view of a customer's CNC machining of a registration recess into a block of material.

The part 10 is checked to verify that it fits within a standard sized block of workpiece material which can be machined using the CNC machine 34 identified by the customer or available at the local CNC toolshop, such as the roughly 6×6×2 inch block 36 shown in FIG. 3. This step corresponds to verifying that the part 10 can be molded in a standard mold block size in the Protomold patented system. The size of the part 10 is only limited by the sizes of workpiece material blocks 36 available and the maximum sizes handled by the CNC machine 34 used. However, machining of the part 10 will require a selection of a block 36 of workpiece material and an appropriately sized registration fixture 38 (explained below and shown in FIG. 13), and it is better to inform the customer of an inconvenient or costly size of the part 10 before commencing machining. The term "block" as used herein is not intended to be limiting as to the shape, but rather to designate whatever solid shapes of workpiece material are available for the machining operation. While the customer can obtain blocks 36 of workpiece material from other sources, one preferred method of carrying out the invention is for the entity that calculates the toolpaths to pre-supply blocks 36 of workpiece material to the customer. The customer can pre-order and stock standard blocks 36 of standard workpiece materials/standard sizes that that customer ordinarily uses. The purpose of the invention is to minimize the time from finalizing the CAD file 28 to having a corresponding part 10 in the customer's hand, and such pre-stocking of workpiece material blocks 36 avoids delaying the CAD-file-to-part turnaround time.

In addition to selecting the CNC machine 34 and/or local toolshop where the part 10 will be machined, the customer identifies the material or the hardness of the material from which the part 10 is to be machined. The present invention can be used to machine parts from a wide range of materials, primarily including materials that are solid at room temperature and can be readily machined at room temperature, and are relatively inexpensive in block form (so machining waste is not prohibitively expensive). For instance, the present invention can be used with plastics, metals (such as aluminum), organics (such as wood), minerals (such as granite), ceramics or composite materials. Further, the material selected and identified by the customer should be sufficiently soft relative to machine tools and have a sufficiently low coefficient of thermal conduction so as not to overly soften or melt the preferred potting materials during machining the B-side 42 of the part 10 as will be subsequently explained. If temperature controls are added to the manufacturing environment and appropriate potting materials are used, the present invention can be used for yet a wider range of materials which may not be solid at room temperature, such as ice which must be kept frozen prior to and during machining. Regardless of what material is selected, the term "workpiece" material is used herein to refer to the solid material which is being machined to form the part. The customer's identification of the workpiece material or the hardness of the workpiece material is used to determine CNC machine tool advance rates and tools for proper machining of the selected and identified material. If the customer will be machining the part 10 on the customer's own CNC machine 34, the customer will need to select a workpiece material that the customer has on hand or available. If the customer will have the part 10 machined at a local toolshop, the customer will need to select a workpiece material that the toolshop has in stock.

The shape of the part 10 is checked to verify that it can be CNC machined, preferably with a standard CNC tool set, in a reasonably limited number of orientations. With the cam part 10 of FIG. 1, the part 10 can be CNC machined in two orientations, basically the "front" or "A-side" 40 and the "back" or "B-side" 42 of the cam 10. The front side 40 and the back side 42 of the cam 10 correspond to the A-side and the B-side of the mold if the part 10 were to be molded using the Protomold patented system, with the separation line between the front side 40 and back side 42 of the part 10 corresponding to the parting line between the A-side and B-side of the mold. While the A-side could face at an angle relative to the B-side, for most applications the A side of the part faces 180° opposite the B-side. For the cam 10 and for many parts, only two opposing orientations are needed. Other, more complicated parts may involve further orientations, which would correspond to side actions in the Protomold patented system.

Based upon the received CAD file 28, CNC tool paths are generated in the processor bank 32 to machine the part 10. The CNC tool paths correspond to a negative image of the material removal tool paths generated in the Protomold patented system to machine the mold. The CNC tool paths for machining the part 10 are also generated in the opposite orientation as the CNC tool paths generated in the Protomold patented system to machine the mold. That is, while CNC tool paths generated in the Protomold patented system are generally oriented away from the parting line, CNC tool paths for machining the part 10 are generated oriented toward the separation line between the A-side 40 and the B-side 42 of the part 10.

When the CNC tool paths are generated, the CNC tool path instructions 44 are transmitted back to a customer-provided address, i.e., either to the computer that the customer has identified for use on the customer's CNC mill 34, or to the computer for the local CNC toolshop where the part 10 will be machined. Importantly, the CNC tool path instructions 44 transmitted include instructions not only for the profile or outer surface of the part 10, but also for features of the A-side cavity which will facilitate solidification fixturing as described herein. Because the CNC tool path instructions 44 can be transmitted over the internet, the analysis of the customer's CAD file 28, calculation of tool paths, and transmission of toolpath instructions 44 to the customer's defined address can occur at any time of day, without regard for any carrier or shipment schedule. From the time that the CAD file 28 of the part shape is finalized, the customer can receive corresponding toolpath instructions 44 in hours or even minutes after transmitting the CAD file 28 to the server 30. The customer then can use the transmitted toolpath instructions 44 to total profile machine the part 10 at the customer's location or a location local to the customer. Thus, the customer can commence machining of the part 10 minutes after receiving the corresponding toolpath instructions 44, and can have a part 10 in hand just as soon as the total profile machining is completed.

A first step using the transmitted CNC machining instructions 44 in total profile machining a block 36 of workpiece material into the cam 10 is shown in FIG. 3. The CNC machining instructions 44 define a registration recess 46 machined into the A-side 40 of the block 36 of workpiece material from which the part 10 will be total profile machined. The registration recess 46 is preferably bounded within the block 36 of workpiece material and thus defines a peripheral wall 48. The registration recess 46 is removed from the profile of the part 10, i.e., non-intersecting with any of the exterior surfaces of the part 10. While the registration recess could be defined with the peripheral wall facing outward, the preferred registration recess 46 faces inward, so the workpiece material to the inside of the peripheral wall 48 of the registration recess 46 is cut away shorter than the encircling remainder 50 of the block 36. The registration recess 46 encircles the part 10 in the sense that it provides sufficient structure to completely define the position of the registration fixture 38 which will be placed therein as discussed below and shown in FIG. 13. While the registration recess could partially encircle the part 10 and still be effective, the preferred registration recess 46 provides a peripheral wall 48 which completely and continuously encircles the part 10. To minimize waste, the registration recess 46 preferably has a plan shape similar to the plan shape of the block 36 of workpiece material.

The preferred transmitted CNC machining instructions 44 define a registration recess 46 which is rectangular and has a planar bottom surface 52. The location of the registration recess 46 with respect to the sides 54, 56, 58, 60 of the block 36 is not particularly important, so the original dimensions of the block 36 and the customer's act of locating and fixturing the block 36 in the CNC machine 34 during this stage of the machining process is not critical. A rectangular shape of both the block 36 of workpiece material and the registration recess 46 assists in minimizing waste and making it simple to fixture the block 36 into the CNC machine 34 such as by using a vice (not shown) and fence (not shown) of the CNC machine 34. As shown, the registration recess 46 is offset slightly closer to the left wall 54 and the front wall 56 than to the right wall 58 and the back wall 60. This offset may have been due to the original block 36 being wider or taller than specified nominal dimensions, such as due to a wide tolerance on forming or sawing the workpiece material into the block shape shown. This offset may separately be due to fixturing the block 36 of workpiece material slightly off-center in the CNC machine 34. Either way, all subsequent machining operations will be located relative to the location of the registration recess 46, not based upon the walls 54, 56, 58, 60 of the block 36, and the exact location of the registration recess 46 relative to the walls 54, 56, 58, 60 of the block 36 is not critical. FIGS. 3-6 show an exemplary registration recess 46 of a 5×5 inch square. Another preferred registration recess is a 4.5×5 inch rectangle having a peripheral wall 48 which is 0.125 inches deep. The ⅛ inch depth is sufficient to hold the registration fixture 38. The ⅛ inch depth is also sufficient for most materials that the shrinkage during solidification of potting material will not cause the top surface of the potting material to sink below the bottom 52 of the registration recess 46. The registration recess 46 can be machined such as with a mill tool 62. Yet another preferred registration recess angles one of the corners off, so the customer can only insert the corresponding registration fixture into the registration recess in one orientation. It will be understood that a wide variety of other shapes and dimensions of registration recesses could be alternatively used, provided the registration fixture 38 matches the registration recess.

Figure 4:
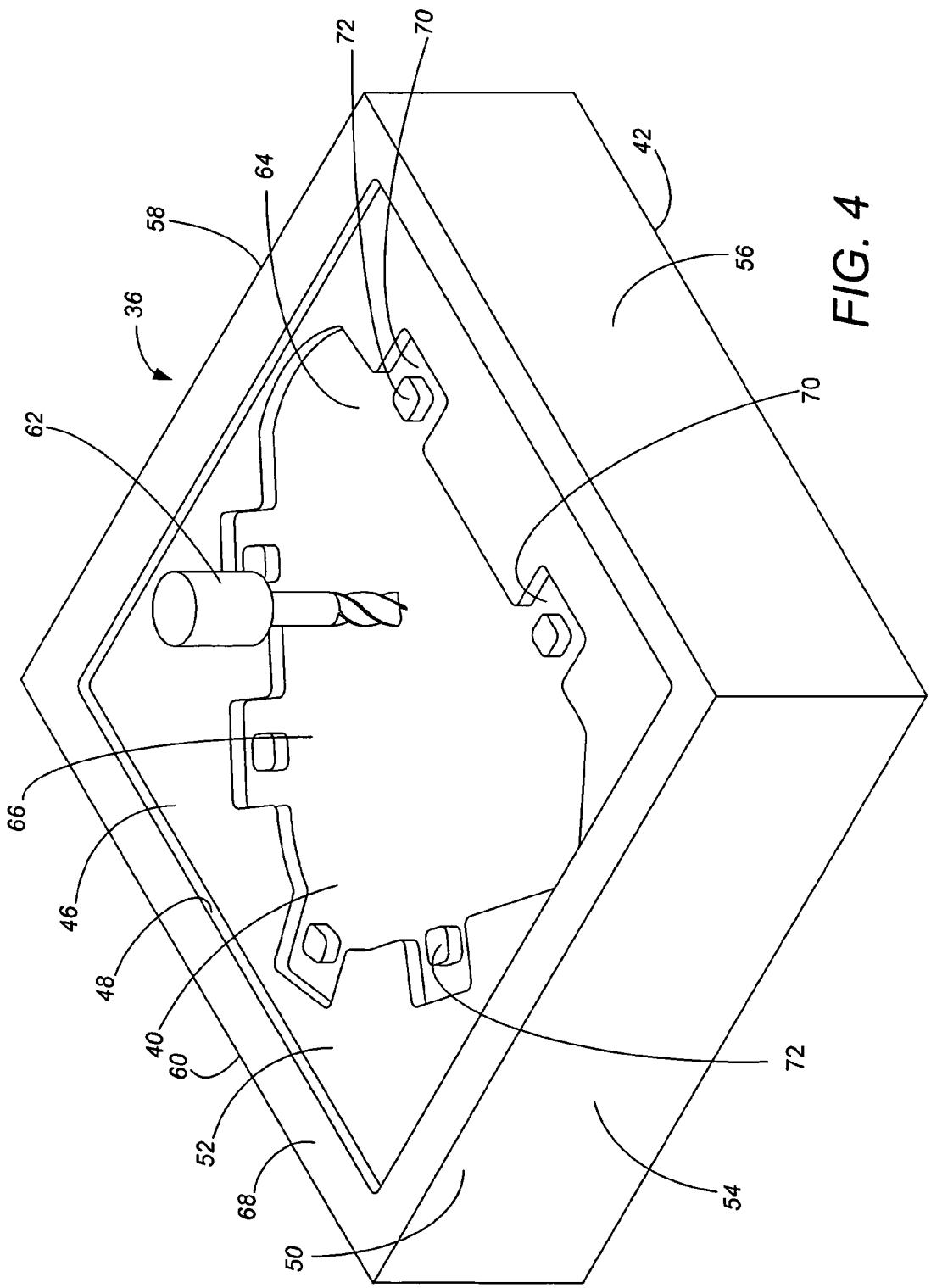
FIG. 4 is a perspective view of the customer's CNC machining channel features and a recessed upper face of the part in the block of material.

The next step in the transmitted CNC machining instructions 44 defines a set-off 64 over the A-side 40 of the part 10 as shown in FIG. 4. The set-off depth is preferably chosen to permit flow of the potting material during the potting operation to move over the A-face of the part 10. The preferred set-off depth is about 0.2 inches deep, such as by using a mill 62 to cut down to the top surface 66 of the part outline flange 12 of the cam 10. Alternatively, the part 10 may be positioned as close as possible to the top 68 of the block 36 of workpiece material, in which case the registration fixture (described below) would alternatively have a recess for potting material flow over the A-side 40 of the part 10. Regardless, it is preferred to CNC machine the top surface 66 of the part 10 to accurately locate the top surface 66 of the part 10 relative to the bottom surface 52 of the registration recess 46, and to remove any non-planarity or defects in the surface 68 of the workpiece material block 36. The set-off 64 is preferably wider than the part profile in plan view by a margin corresponding to the tools which will be used to machine the A-side profile of the part 10, such as a ¼ inch clearance for a ¼ inch diameter end mill 62. Depending upon the depth required for the A-side 40 of the part 10, the set-off 64 may need to be wider to account for the collet of the tool 62. The set-off 64 and tool(s) 62 chosen also preferably fit within the plan view of the registration recess 46, so machining the set-off 64 does not overlap or cut into the peripheral wall 48 of the registration recess 46.

In addition to machining the set-off 64, the preferred CNC machining instructions 44 define one or more features that are useful in potting of the A-side of the part 10. One such feature is a channel feature 70 for the potting material machined into the encircling block 50 of material. In the embodiment shown in FIG. 4, the transmitted CNC machining instructions 44 define six channel features 70 machined into the workpiece block 36. The location of each channel feature 70 is selected so as to be outside the part boundary and inside the registration recess 46. The purpose of the channel features 70 is to better secure the potting material to the encircling block 50 of workpiece material so the potting material does not dislodge during machining of the B-side of the part 10. Accordingly, the channel features 70 are shaped to form an interlocking relationship with the encircling block 50 of workpiece material. Such channel features 70 are particularly important in machining parts which are circular or cylindrical in nature, i.e., wherein machining of the B-side of the part could induce rotation of the part and potting material relative to the encircling block 50 of workpiece material. The preferred channel features 70 are circuitous channel features each around a raised "island" 72 of workpiece material. Such "islands" 72 have been found particularly good at preventing separation of the potting material from the encircling block 50 of workpiece material, even when the potting material is merely poured over the A-side of the block 36. The channel features 70 also eliminate or greatly reduce the possibility of the potting material 68 (described below) separating from the encircling remainder 50 of the block 36 and pulling through during B-side machining. The particular shapes and sizes of the channel features 70 and of the islands 72 can vary widely and still provide the interlocking function securing the potting material to the encircling block 50.

Figure 5:
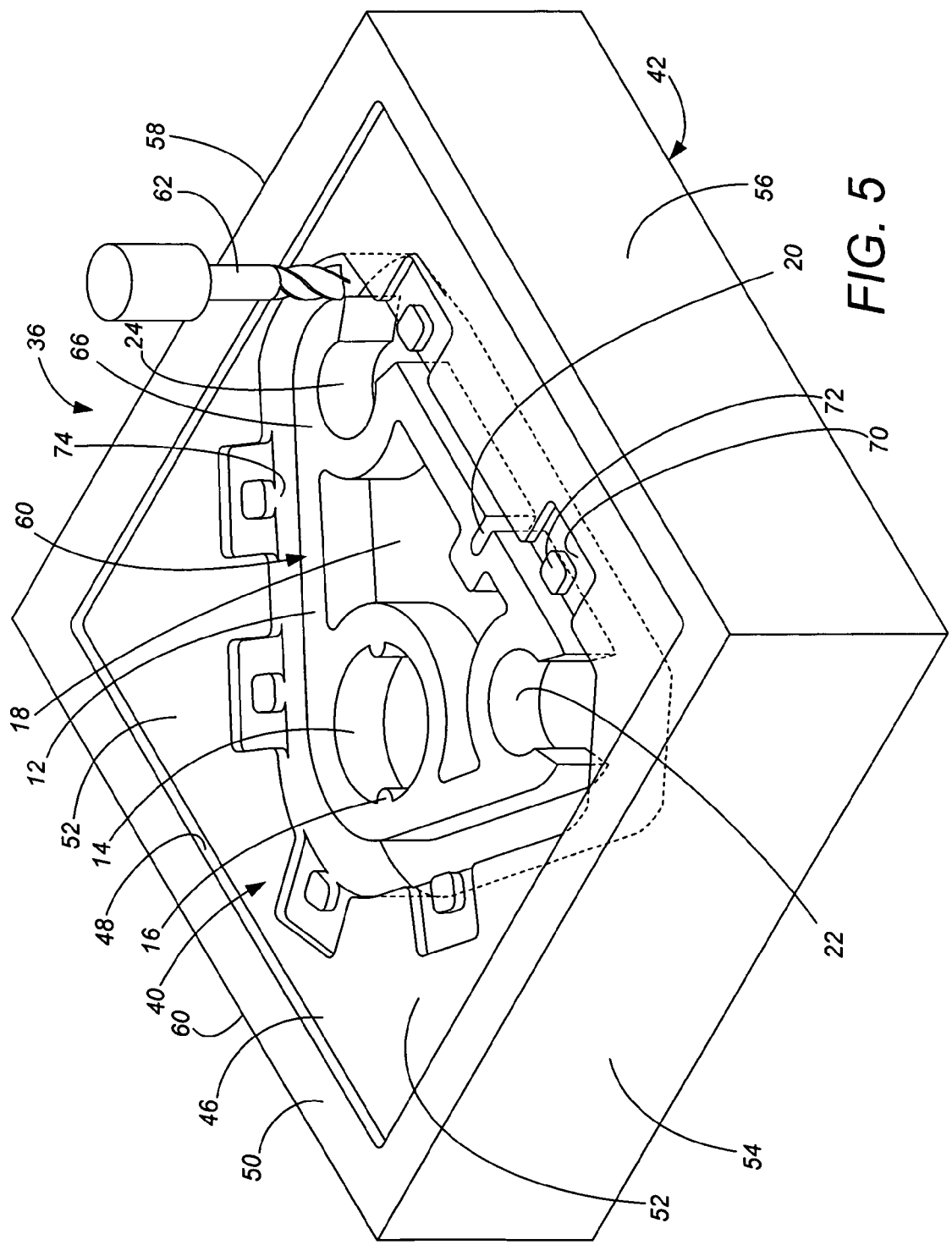
FIG. 5 is a perspective view of CNC machining further features of an "A" side of the part in the block of material.
Figure 6:
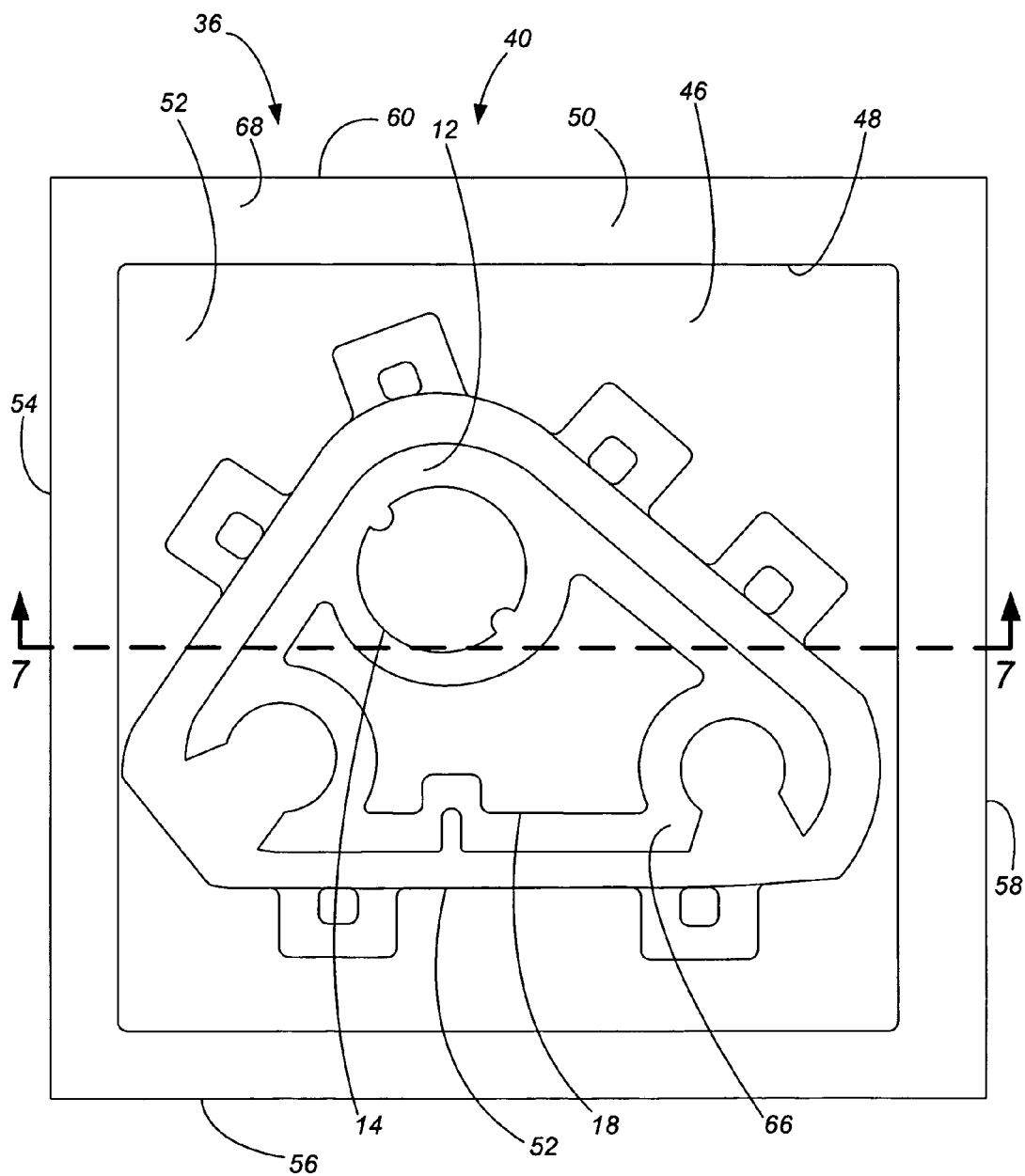
FIG. 6 is an A-side plan view of the block of FIG. 5.
Figure 7:
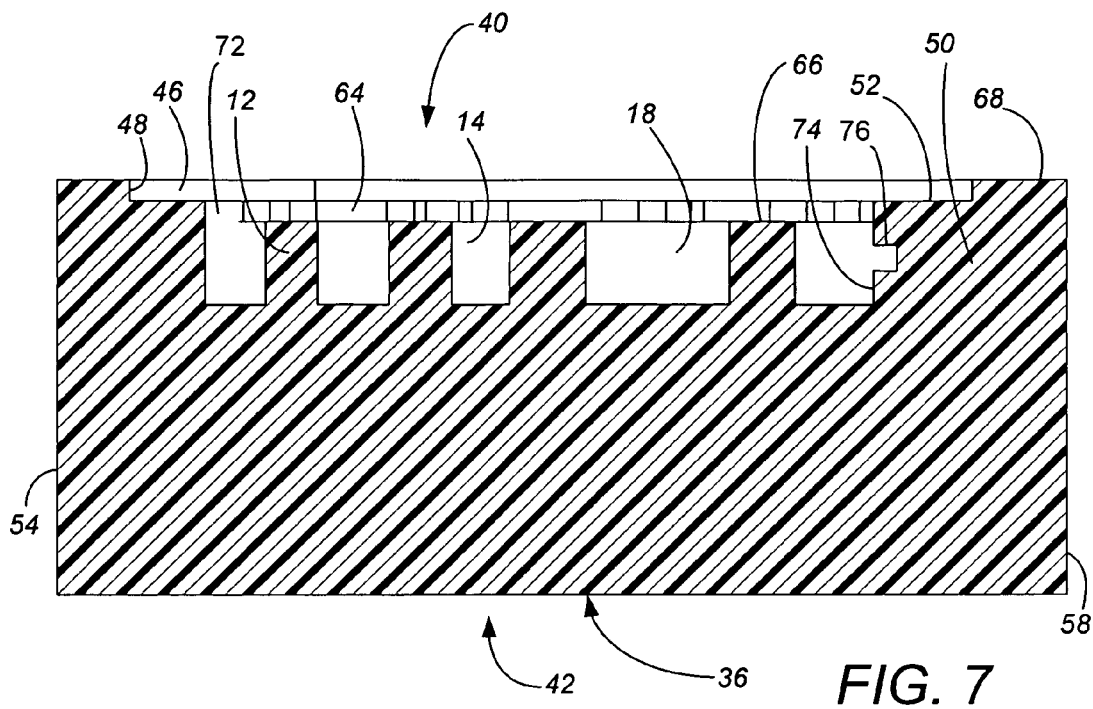
FIG. 7 is a cross-sectional view taken along lines 7-7 in FIG. 6.

Once the set-off 64 and channel features 70 have been machined, the CNC machining instructions 44 continue to define side wall profiles of the A-side 40 of the part 10 as shown in FIGS. 5-7. During this machining operation for the cam 10, the flange 12, the circular opening 14 with two rotation pins 16, the non-circular opening 18, the notch 20 and the two corner holes 22 and 24 all become visible, but not to their full thickness. The partial web 26 and the full depth of the non-circular opening 18, in particular, fall on the B-side 42 of the part 10 and are not yet machined. With none of the B-side 42 of the part 10 yet machined, there are no problems with vibration or deflection of the part 10 during machining. While the cam part 10 shown has no surfaces angled relative to the z-direction of the CNC machine 34, any angled surfaces could easily be machined into the A-side 40 of the part 10 provided the surface is accessible with a CNC tool given the block orientation. Additionally, in many instances it is beneficial to undercut the outside surface 74 which connects to the set-off 64. If the outside surface 74 is machined with an undercut feature 76, the possibility of the potting material 78 (described below) separating from the encircling remainder 50 of the block 36 and either pulling or pushing through during B-side machining is eliminated or greatly reduced.

While the cam part 10 shown has no features which cannot be injection molded, it should be noted that machining of the outer profile of the part 10 permits exterior features which would typically be machined even into an injection molded part. A common example is a hole or bore which is tapped or threaded. If injection molding is used to create the part, after injection molding the part will typically be further machined to cut threads into the hole. Because the present invention uses machining to create the substantial majority of the outer profile of the part, threading on the holes can be simply fabricated as part of the CNC machining operation, i.e., without requiring a separate and distinct manufacturing process.

The block 36 does not need to be moved or fixtured again with respect to the CNC machine 34, but rather the same fixturing (not shown) for the block 36 can be used for the A-side machining as was used for the registration recess 46, without moving the block 36. Regardless of tolerances on the block walls 54, 56, 58, 60 or how the block 36 is located on the CNC machine 34, the A-side 40 of the part 10 is machined in the exactly defined location relative to the registration recess 46 because the block 36 was not moved in between the machining operations. Thus, even though some aspects of the present invention could be used to obtain an even better turn-around time by machining registration recesses (and if desired set-offs and channel features) into blocks and maintaining an inventory of such blocks prior to receipt of the CAD data file 28 and transmission of the CNC machining instructions 44, the preferred method is to do all A-side CNC machining in a single placement and fixturing of the block 36 into the CNC machine 34. It is not significant which features on the A-side 40 of the workpiece material block 36 are machined in which order. For instance, rather than machining the channel features 70 initially during machining of the set-off 64, the channel features 70 and the undercut features 76 can be machined after the entire A-side profile of the part 10 has been machined.

Once the A-side 40 of the part 10 has been machined, fluid potting material 78 is introduced into the machined cavity. The preferred method of introducing potting material 78 is to pour heated, molten potting material 78 from a simple heating vessel 80 into the A-side cavity, which such pouring including a significant overflow over the set-off 64, such as substantially filling the registration recess 46. The overflow provides a source of potting material 78 during solidification shrinkage of the potting material 78, i.e., usually during solidification the potting material 78 will shrink into the cavity, forming a sunken top surface 82. However, in the preferred method the sunken top surface 82 is still at an elevation higher than the bottom 52 of the registration recess 46. During pouring and solidification of the potting material 78, the workpiece block 36 is oriented A-side up, such that gravity helps to pack the potting material 78 into the A-side cavity.

The potting material 78 is selected based upon the support characteristics and solidification characteristics desired for the workpiece material of the block 36. For many of the plastic workpiece materials contemplated for the primary application of the present invention, a preferred potting material 78 is a water soluble VFW-148 wax from Westech Products of Corona, Calif. The water soluble wax has a pour temperature in the range of about 150 to 200° F. but is solid at room temperature. The customer can directly obtain potting material 78 from third party sources, or can obtain potting material 78 together with workpiece blocks 36 of material as part of a turnkey kit to enable the customer to perform extremely quick turn-around total profile machining on their own CNC mill 34. The customer then merely heats the wax 78 into a liquid state and hand pours it into the A-side cavity until the wax 78 flows over the entire top surface of the part 10 including the channel features 70 and partly or largely fills the registration recess 46. Because the wax 78 is liquid at a relatively low temperature (lower than the boiling point of water), customers generally feel comfortable melting the wax 78 (such as on a common stovetop) and pouring the liquid wax 78 into the workpiece block 36 by hand. Because the wax 78 is solid at room temperature, the solidification process is simply achieved by letting the wax 78 cool for a limited period of time, typically less than an hour. Other potting or support materials could alternatively be used, particularly in situations wherein the customer has further or different capabilities or restrictions in handling the liquid potting material 78 or in handling the solidification process.

If desired, the pouring of the potting material 78 into the machined cavity can be performed without removing the block 36 of workpiece material from the CNC machine 34. This advantageously prevents any different location of the block 36 of workpiece material for machining of the support surface 84 into the potting material 78, but has the disadvantage of occupying the CNC machine 34 while waiting for solidification. Alternatively, the block 36 of workpiece material can be removed from the CNC machine 34, and the potting material 78 poured into the recess remotely from the CNC machine 34. In either event, solidification of the potting material 78 occurs prior to further machining.

Figure 10:
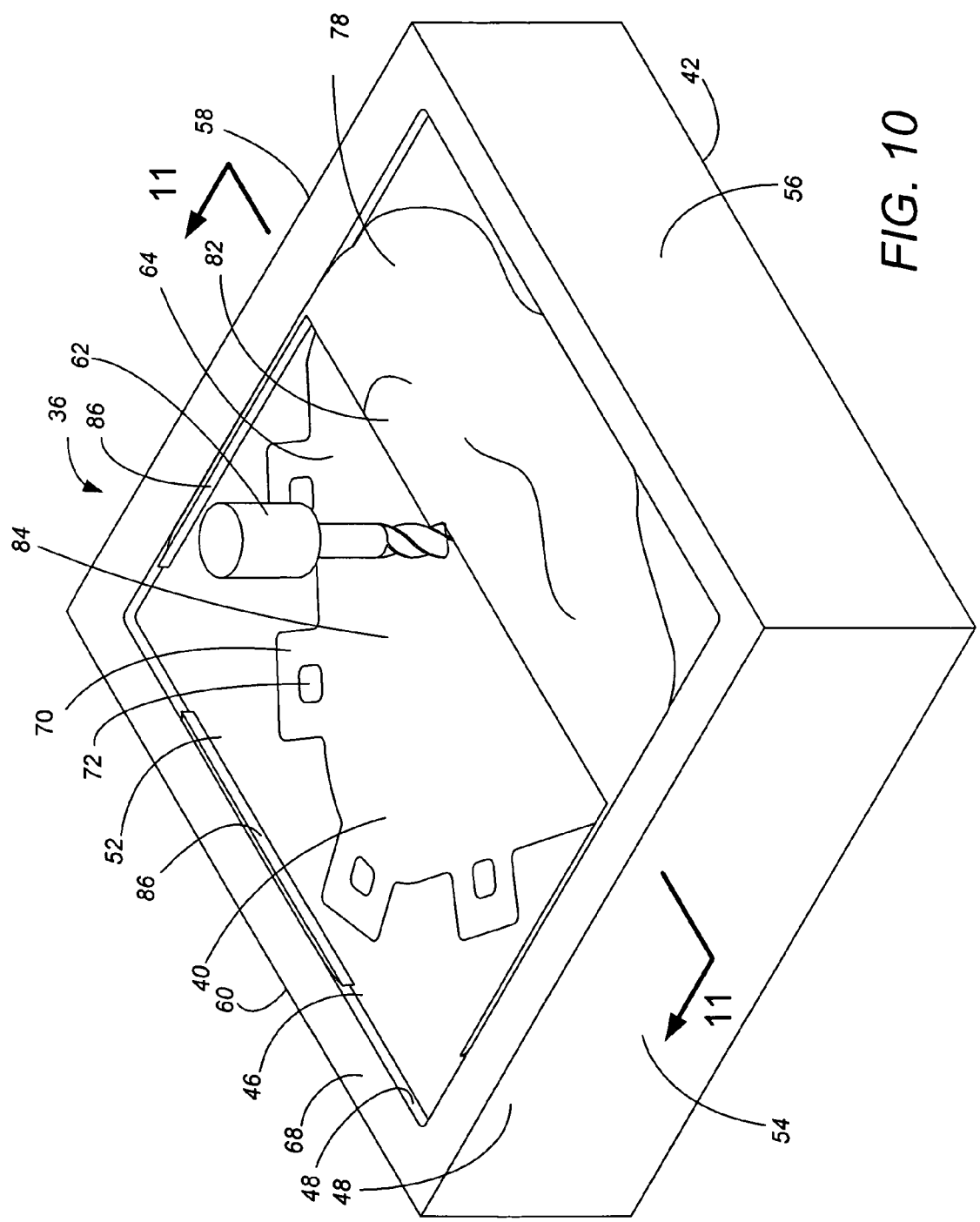
FIG. 10 is a perspective view of CNC machining of the support profile into the solidified support material.
Figure 11:
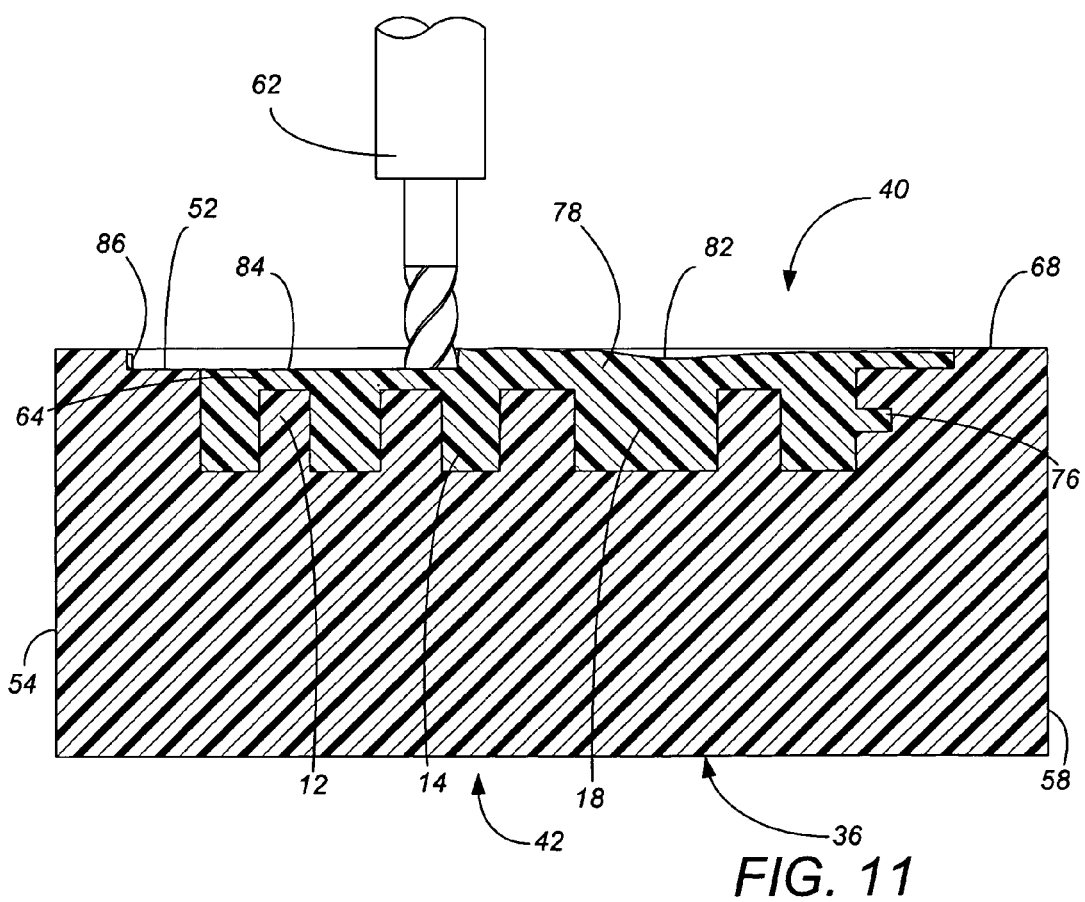
FIG. 11 is a cross-sectional side view taken along lines 11-11 in FIG. 10 showing CNC machining of the support profile into the solidified support material.

After the potting material 78 has solidified, CNC machining on the A-side is resumed as shown in FIGS. 10 and 11. The purpose of the resumed A-side machining is to machine a defined support surface 84 into the solidified potting material 78. Thus, in the preferred embodiment, the post-solidification A-side machining consists of re-machining the majority of the registration recess 46. If the pouring and solidification of the potting material 78 occurred on the CNC machine 34, the registration recess 46 may simply be remachined over its original dimensions, this time removing only the overpour of the potting material 78 rather than removing workpiece material. If the block 36 was removed from the CNC machine 34 during pouring and/or solidification of the potting material 78, then it is preferred that the CNC machining of the potting material 78 be slightly smaller than the registration recess 46, so as to avoid the possibility that the post-solidification A-side machining could cut into the registration recess surface. This may leave a thin margin 86 of potting wax 78 on the registration recess surface, which can be easily scraped off by hand using any handheld scraping tool prior to placement of the registration fixture 38 into the registration recess 46.

Figure 13:
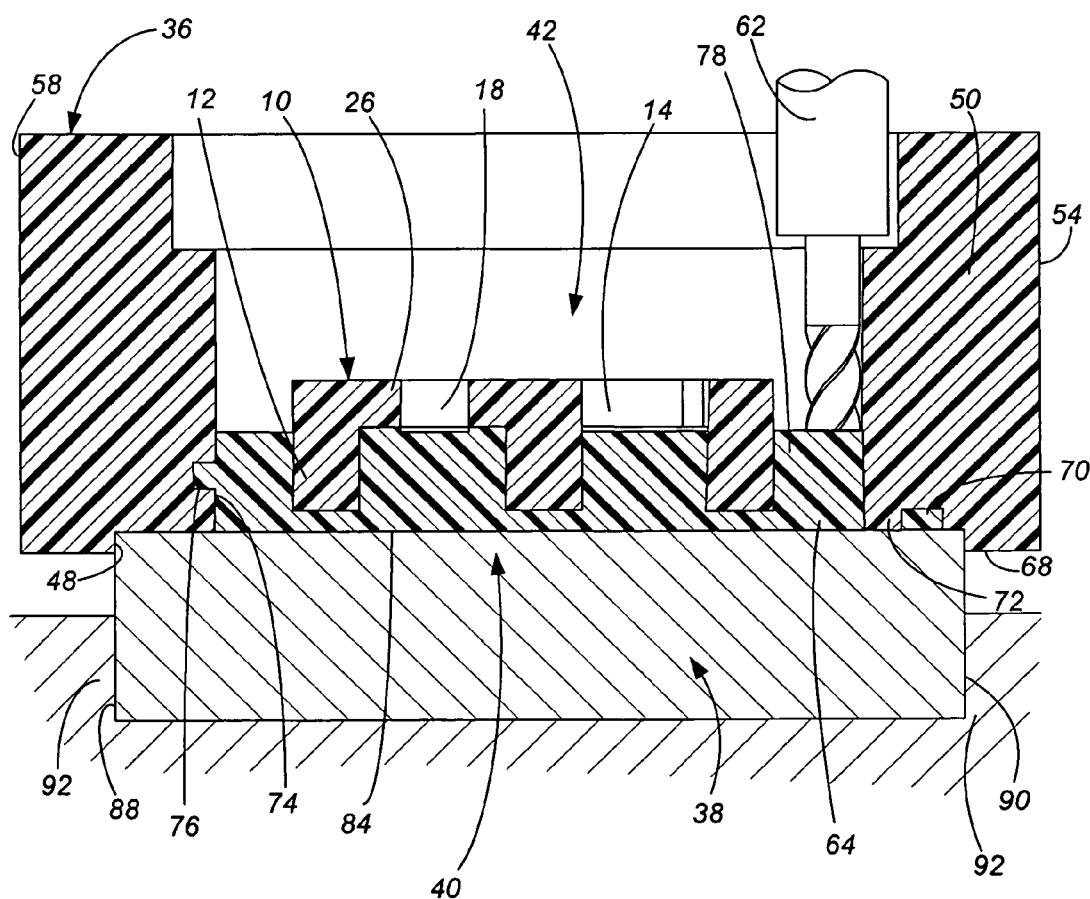
FIG. 13 is a cross-sectional view taken along lines 13-13 in FIG. 12 at completion of CNC machining the "B" side of the part.

The preferred registration fixture 38 mates identically into the 5×5 inch registration recess 46 as shown in FIG. 13. However, the shape of the registration recess 46 is not as important as the fact that the registration recess 46 is defined to be a size and shape which mates with the size and shape of the registration fixture 38. Similarly, the top surface of the registration fixture 38 should match the support surface 84 which has been machined into the potting wax 78. That is, the registration fixture 38 should have significant surface contact with the support surface 84 of the potting material 78. The portion of the registration fixture 38 outside the registration recess 46 preferably includes opposing exterior walls 88, 90 at right angles, such as the rectangular shape shown, which assist in subsequent fixturing of the part 10 for B-side machining.

Figure 12:
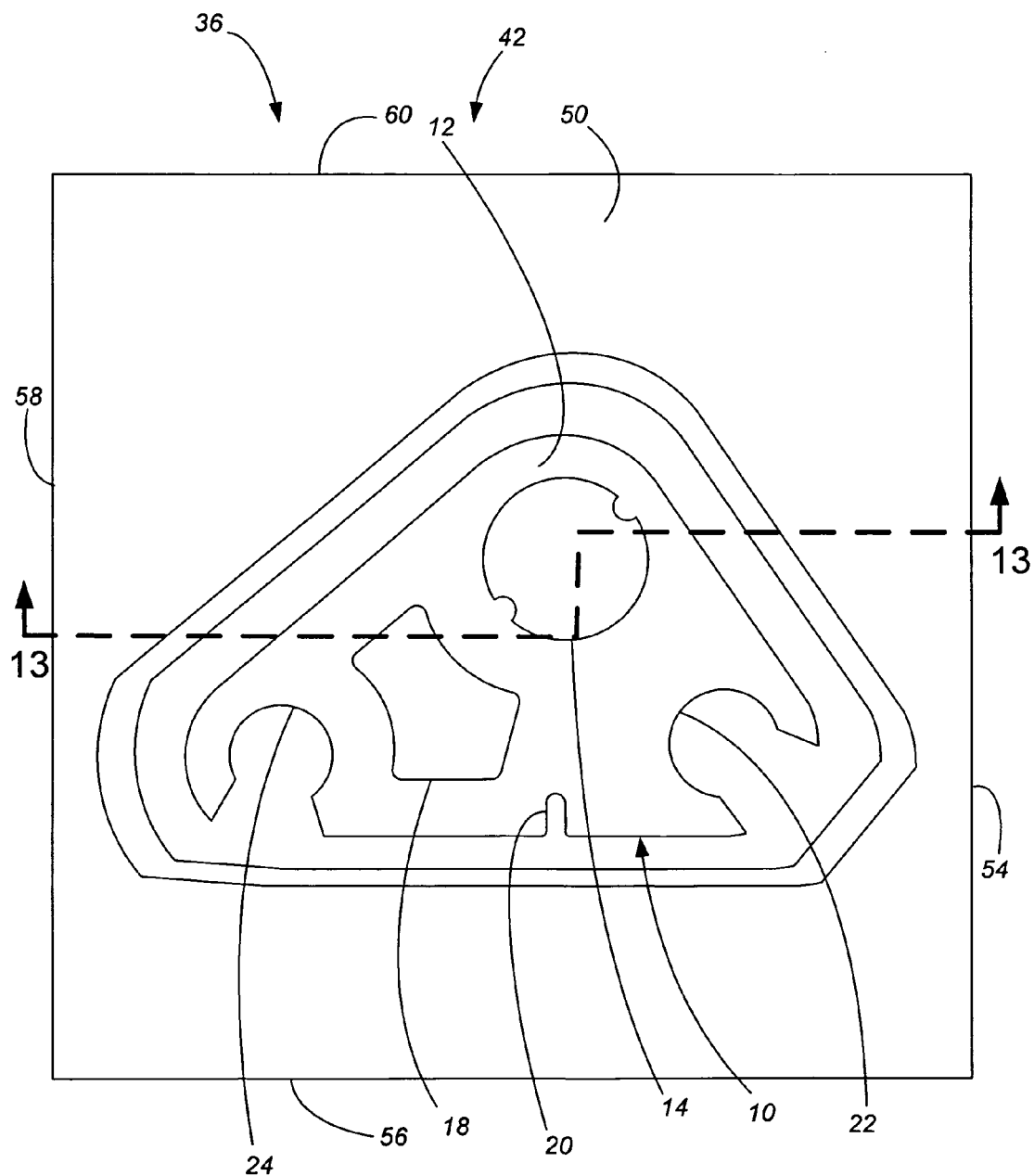
FIG. 12 is a B-side plan view at completion of CNC machining of the B-side of the part.

As shown in FIGS. 12 and 13, after the registration fixture 38 has been placed into the registration recess 46, the fixture/block combination is then reoriented such as being flipped over, and the fixture 38 is used in positioning the block 36 in the CNC machine 34 for machining the B-side 42 of the part 10 in the new orientation. Because the dimensions of the registration fixture 38 are known and established for all parts irrespective of the shape of each part, the fixturing 90 can be preset, and securing the registration fixture 38 into the CNC machine 34 can be easily performed, such that the reorientation of the block 36 is accurately and identically established for all parts based upon the location of the registration recess 46.

Figure 14:
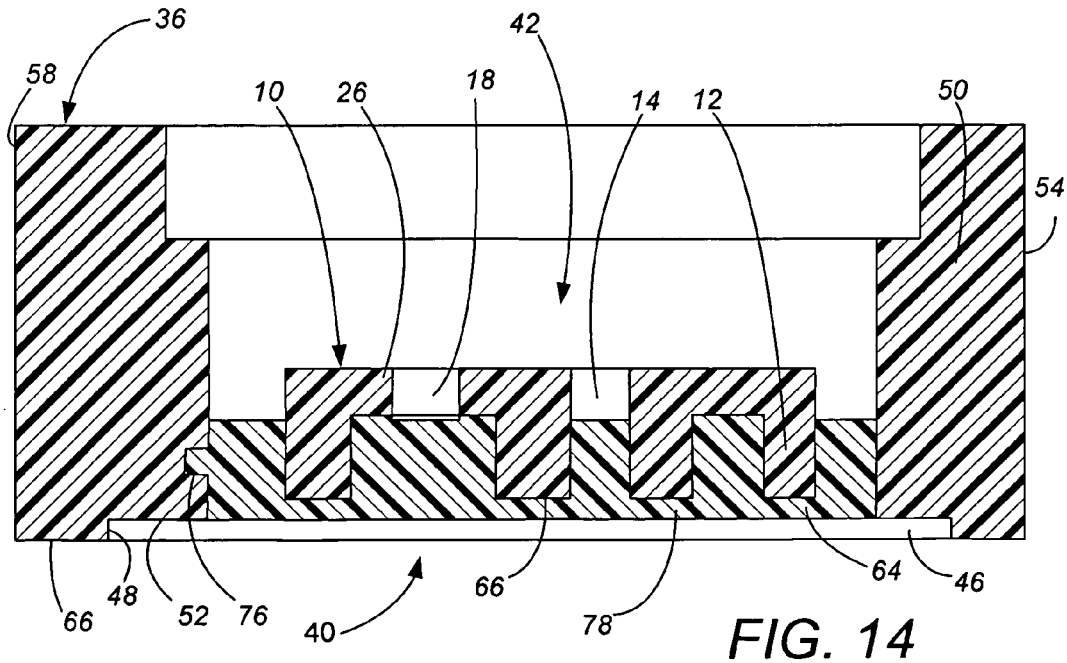
FIG. 14 is a cross-sectional view taken at the same (lines 7-7) cut location as FIG. 7 after completion of CNC machining the "B" side of the part.
Figure 8:
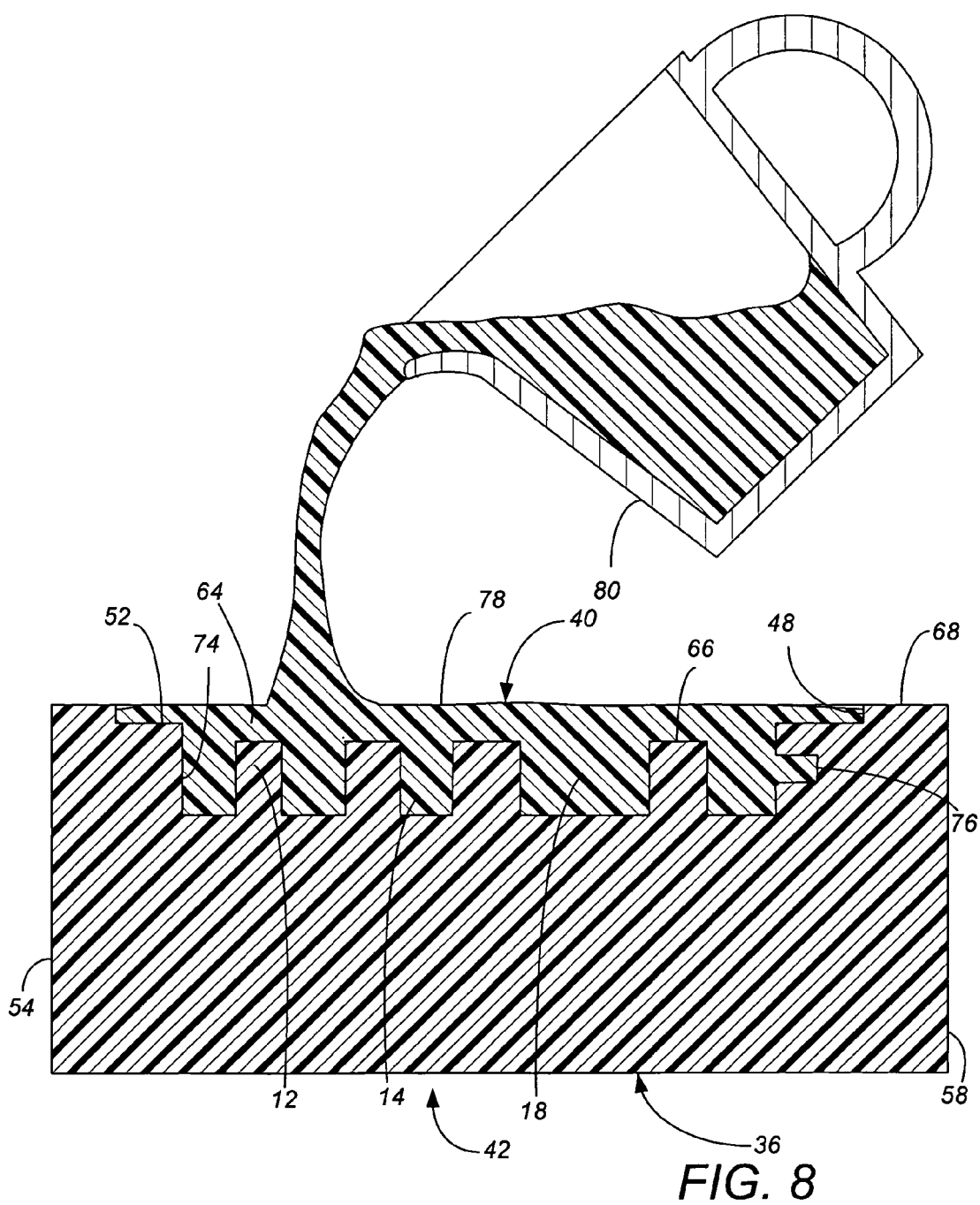
FIG. 8 is a cross-sectional side view taken at the same (lines 7-7) cut location as FIG. 7 showing pouring of fluid support material into the cavity.
Figure 9:
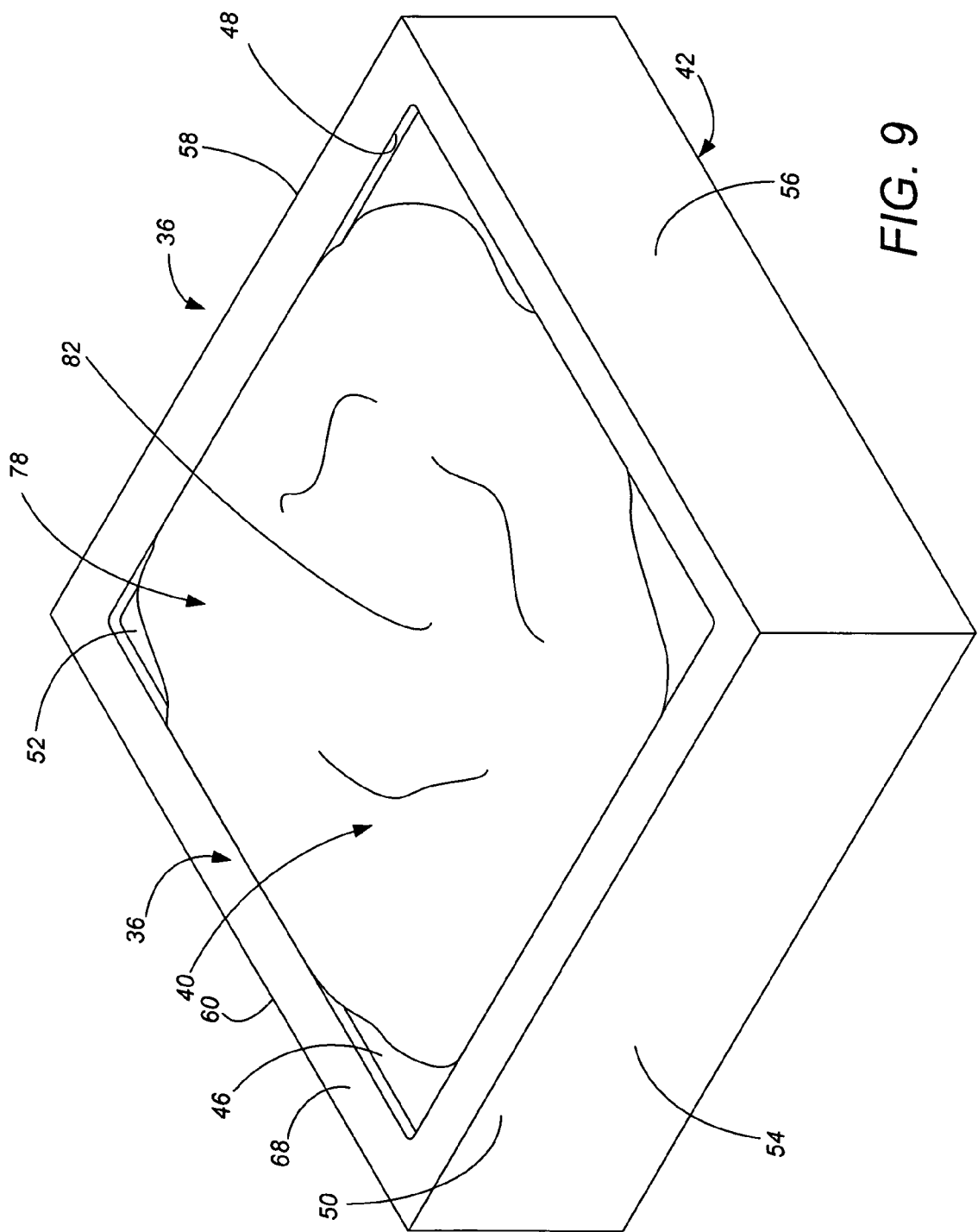
FIG. 9 is a perspective view of the block after solidification of the support material.

CNC machining is continued on the B-side 42 of the part 10 until the substantial entirely of the surface profile of the part 10 has been machined as shown in FIGS. 13 and 14. Because the machined support surface 84 of the solidified potting material 78 mates with the registration fixture 38 without gapping, the solidified potting material 78 is securely held in place and supports the part 10 without deflection during CNC machining of the B-side. As used herein, this is called "total profile machining", as very little or none of the surface of the original block 36 provides any of the surfaces of the part 10. Total profile machining does not necessarily mean that other forming operations could not be used to form a surface of the part 10, but rather to indicate that the machining operations result in a substantially complete separation between the part 10 and the encircling outer portion 50 of the block 36.

Once the B-side machining has progressed to the point that the part 10 is substantially or totally defined separate from the encircling portion 50 of the block 36, then the potting material 78 is removed from the part 10 to free the part 10 from the block 36. The method of removal of the potting material 78 depends upon what type of potting material was selected, with the preferred methods being melting off the potting material 78 and dissolving the potting material 78 in a solvent. If heat is applied during removal of the potting material 78, care must be taken that the part 10 is not heated to the melting or softening temperature of the workpiece material of the part 10. With the most preferred potting material 78 of water soluble wax, removal of the potting material 78 is simply performed by washing the part 10 in water.

It will thus be understood that the present invention provides a method and system for automated total profile machining of parts. Because the parts are fixtured into the CNC mill without regard to the shape of the part 10 and without criticality of the shape or positioning of the workpiece material block 36, the invention accurately total profile machines parts without the need to design any custom fixturing for the shape of the part 10. Without the need for custom fixturing and with a method and system which can be equally applied to a wide variety of part shapes, parts can be total profile machined at a much lower cost than was previously possible. By transmitting the toolpath instructions 44 to a customer defined address for use on a CNC mill 34 at or near the location that the customer wants the part 10, shipping time for total profile machined parts is eliminated or greatly reduced. The transmitted toolpaths 44 facilitate the customer's use of a potting material 78 in conjunction with a registration fixture 38 to carry out the total profile machining quickly and accurately.

Although the present invention has been described with reference to preferred embodiments, workers skilled in the art will recognize that changes may be made in form and detail without departing from the spirit and scope of the invention. As one example, the CNC machining of the A- and B-sides of the part 10 is explained in steps to facilitate understanding of the inventive method. The order of machining various sections of the A-side of the part is unimportant, provided all sections are machined prior to potting the A-side recess. If potting the A-side recess occurs without moving the block 36 relative to the CNC mill 34, even cutting of the registration recess 46 can occur after the A-side recess has been potted. Similarly, the order of machining various sections of the B-side of the part is unimportant.

The invention claimed is:

1. A method of CNC machining a part, comprising:
   CNC machining into a block of workpiece material in a first orientation to define a cavity defining a first portion of an outer surface of the part;
   introducing a fluid support material into the cavity;
   solidifying the fluid support material in the cavity to form an exposed solidified support material surface;
   CNC machining a registration recess including machining a support profile into at least a portion of the solidified support material surface;
   supporting the block of workpiece material in a second orientation using a registration fixture in the registration recess in contact with the support profile; and
   CNC machining into the supported block of workpiece material in a second orientation, the CNC machining separating the part from the supported block of workpiece material such that the part is essentially supported by the solidified support material.

2. The method of claim 1, wherein the CNC machining occurs in a CNC mill, wherein the machining of the cavity, introducing and solidifying of fluid support material and machining of the support profile occur without moving the block of workpiece material relative to the CNC mill.

3. The method of claim 1, using gravitational pack of the liquefied fluid support material into the cavity with an exposed upper surface of liquefied fluid support material.

4. The method of claim 1, wherein registration recess is planar, and wherein the support profile is a planar surface which is coplanar with the registration recess.

5. The method of claim 1, wherein the machining of the registration recess occurs a first time prior to the machining of the cavity.

6. The method of claim 5, wherein machining of a support profile involves machining a region slightly smaller than the registration recess.

7. The method of claim 6, further comprising hand removing edge portions of solidified support material after machining of the support profile and before placing the registration fixture into the registration recess.

8. The method of claim 1, wherein the solidified support material is water soluble, and further comprising dissolving the solidified support material to remove the part from the block of workpiece material.

9. The method of claim 1, wherein instructions for the CNC machining acts are transmitted over the internet.

10. The method of claim 1, wherein the cavity comprises a channel feature for the fluid support material, the channel feature being defined in the block of material separate from the first portion of the outer surface of the part, and wherein the fluid support material is introduced and solidified to extend into the channel feature.

11. The method of claim 10, wherein the channel feature is circuitous.

12. The method of claim 1, wherein the cavity comprises an undercut feature for the fluid support material, and wherein the fluid support material is introduced and solidified to extend into the undercut feature.

* * * * *